2,991,153
PREPARATION OF SODIUM HYDROSULFITE

Robert E. Robinson, Springfield Township, Hamilton County, and Karl Koch, Norwood, Ohio, assignors to National Distillers and Chemical Corporation, New York, N.Y., a corporation of Virginia
No Drawing. Filed Nov. 19, 1958, Ser. No. 774,855
12 Claims. (Cl. 23—116)

This invention relates broadly to an improved process for the manufacture of sodium hydrosulfite. More particularly, it relates to an improved process whereby sodium hydrosulfite may be prepared in high yields from cheap and readily available raw materials.

At the present time sodium hydrosulfite is manufactured commercially by the reaction of sulfur dioxide with zinc dust to form zinc hydrosulfite, followed by the reaction of the latter with sodium hydroxide or sodium carbonate to yield zinc oxide and sodium hydrosulfite. Other methods available include the reaction of sodium bisulfite and sulfur dioxide with formic acid and sodium formate, and the reduction of sodium bisulfite and sulfur dioxide with sodium amalgam. Sodium hydrosulfite also has been prepared by the interaction of sulfur dioxide with a sodium addition product of an aromatic organic hydrocarbon such as a polycyclic aromatic hydrocarbon or an aromatic carbonyl compound in which there is no hydrogen atom attached to a carbon atom adjacent to the carbonyl group. This latter process, however, is uneconomical and commercially useless because of the large quantities of the expensive aromatic hydrocarbon carrier consumed which cannot be recovered.

It has now been discovered that the amount of sodium carrier required for this reaction of sulfur dioxide with a sodium addition product can be reduced to a substantially catalytic level if the sodium is employed in the form of a fine dispersion of controlled particle size. Hence in broad aspect, this invention comprises reacting sulfur dioxide with a finely divided sodium dispersion suspended in a suitable inert organic solvent in the presence of only a catalytic amount of an organic sodium carrier at temperatures below about room temperature, thus obtaining sodium hydrosulfite economically and in good yield from readily available materials.

In typical practice of this invention, a fine dispersion of sodium is diluted with an active ether and contacted with a portion of the sodium carrier. The remaining ether and carrier required are charged directly into the reactor. A portion of the sodium-carrier slurry is added to the reactor and sulfur dioxide flow is initiated. The remaining sodium-carrier slurry is added either continuously or in increments at such a rate as to maintain the sodium-carrier complex color in the reactor. When all of the alkali metal has been added and the complex color is no longer evident in the reaction mixture, the sulfur dioxide flow is terminated. Since the sodium hydrosulfite initially formed in this manner may be unstable, it is best stabilized by conversion to the hydrate which is then dehydrated to an anhydrous product. The specific method of obtaining the stable, dehydrated material varies to some extent with the reaction medium in which the sodium hydrosulfite was synthesized. When sodium hydrosulfite is prepared in a highly volatile organic solvent such as dimethyl ether, water is added and the solvent evaporated to yield an aqueous solution. This is then treated with ethanol and sodium chloride and heated at about 55 to 75° C., and preferably at about 65° C., for a short time to effect dehydration. The material is then washed with ethanol to remove the last traces of water and dried at a temperature in the range of about 25 to about 90° C., and preferably at about 65° C., under reduced pressure. When a less volatile organic solvent, such as tetrahydrofuran, has been used, the freshly prepared slurry can be treated directly with water and ethanol to cause the material to agglomerate; the solution is then concentrated, dehydrated at a temperature in the range of about 55 to about 75° C., and preferably at about 65° C., washed with ethanol, and dried as above.

The reaction of sulfur dioxide with sodium has been found to be very sensitive to the nature of the sodium used and this is a critical feature of the invention. The use, for example, of bulk sodium requires relatively large quantities of a sodium carrier and hence the process is an uneconomical one. When, however, sodium is present in the form of a fine dispersion, the quantity of carrier which is required for the reaction may be reduced to nearly the catalytic level, that is, in the range of about 0.1 to about 5.0 mole percent, so making the process practical and commercially feasible. Thus, in the preferred practice of this invention, the sodium is necessarily present in the form of a finely divided dispersion having a particle size average of between about 1 and about 5 microns, and preferably having a maximum particle size not greater than about 2 microns.

The sodium dispersion may be made by any suitable process, but for the practice of this invention it is preferably prepared in a suitable colloid mill, such as a Gaulin mill, and maintained blanketed with an inert gas. The mill is normally fed from a hopper from which materials are drawn into the chamber of the mill. The chamber is charged with the desired amount of an inert liquid dispersion medium, and the sodium, usually in small pieces, is added to the hopper with the mill in operation. The mill is operated for a period of time sufficient to reduce the size of the sodium and to provide the particle size characteristics required for this invention.

The criticalness of using a very fine dispersion of sodium may be demonstrated, for example, when in this reaction the sulfur dioxide is treated with bulk sodium, the yield of sodium hydrosulfite is about 40 percent, based on the sodium, and one mole of catalyst-carrier, such as terphenyl, per mole of sulfur dioxide is required to give this yield. In the same reaction, the use of finely divided sodium results in a sodium hydrosulfite yield of about 75 percent, based on the sodium, and only about .05 mole of catalyst-carrier, such as terphenyl, per mole of sulfur dioxide is required.

It has been determined that the effectiveness of a particular sodium dispersion diminishes markedly as the dispersion ages. This is not necessarily a function of age per se but is quite likely a consequence of normal handling operations of the dispersion, involving, for example, exposing the material to minute quantities of air, shaking the dispersion vigorously and repeatedly, and so forth. For these reasons, it is highly preferable to have the sodium present in the form of a freshly-prepared dispersion.

The inert liquid dispersion medium for the sodium may be any of a wide variety of materials that are not generally reactive with sodium at the temperatures employed, such as xylene, toluene, Decalin, petroleum fractions, straight-run gasoline, kerosene, alkylate, n-octane, undecane, n-nonane, n-hexadecane, and the like, and mixtures thereof. The amount of dispersion medium used in forming the dispersion is not especially critical, dispersions having sodium concentrations from trace amounts to about 60 percent by weight being suitable. Preferably, however, the most useful dispersions have a sodium concentration of from about 15 to about 30 percent by weight, since extremely low concentrations are inefficient and dispersions having higher sodium concentrations tend to render the reaction mixture somewhat viscous and very high concentrations may even become gel-like in consistency.

In accordance with this invention, the solvent comprises an active ether, that is, a type of ether in which the reaction occurs readily, in contrast to other ethers as solvents in which this reaction occurs slowly or not at all. Suitable ethers as solvents are certain mono ethers, such as dimethyl ether and ethyl methyl ether; aliphatic diethers, such as dimethyl glycol ether, diethyl glycol ether, and methylal; other polyethers, such as fully alkylated glycerols; and cyclic ethers, such as dioxan. Specific examples of such active ethers include tetrahydrofuran, dimethyl ether, ethylene glycol ethers, and the like, and mixtures thereof.

When the reaction of sulfur dioxide with a fine sodium dispersion in an active ether was carried out in an alcohol, such as ethanol, a tetrahydrofuran-ethanol mixture, or a dimethyl ether-ethanol mixture, generally poor yields of sodium hydrosulfite were obtained, such yields being no higher than about 30 percent. On the other hand, yields of up to about 80 percent of sodium hydrosulfite were obtained when the same reaction was catalyzed by small amounts, for example about 0.1 to about 5.0 mole percent, of a sodium carrier as defined below. As a sodium carrier, various organic compounds which react with alkali metals without hydrogen evolution to form addition compounds may be used. Examples of such organic compounds are the polycyclic aromatic hydrocarbons, such as naphthalene, diphenyl, phenanthrene, anthracene, acenaphthene, and the terphenyls and aromatic carbonyl compounds in which there is no hydrogen atom attached to a carbon atom adjacent to the carbonyl group, such as anthraquinone; diaryl ketones, such as benzophenone; esters of aromatic acids, such as alkyl benzoates, benzyl and phenyl benzoates; or various derivatives of the above compounds, such as their alkyl derivatives. Also aliphatic ketones having two tertiary alkyl groups adjacent to the carbonyl group, such as di-tertiary butyl ketone, or aryl alkyl ketones where the alkyl radical has a tertiary carbon atom adjacent to the carbonyl group may be employed since such ketones, which have no hydrogen atom on the carbon atom adjacent to the carbonyl group, will form addition compounds with alkali metals without hydrogen evolution. Approximately catalytic amounts of the sodium carrier-catalyst are required; this may range from about 0.1 to about 5.0 mole percent, and preferably about 0.5 to about 2.0 mole percent is used.

The synthesis of sodium hydrosulfite from sulfur dioxide and sodium proceeds readily at temperatures below about 25° C., i.e. room temperature; in general temperatures of from about −5 to about −35° C. are preferably employed.

Sodium hydrosulfite is of major importance as a reductive bleach in the textile industry. It is also used industrially as a bleaching agent for soap, sugar, paper and pulp, straw and other cellulosic materials; as a catalyst for the formation of thioamides; in the preparation of pharmaceuticals and organic intermediates; and in the preparation of dyestuffs.

The following examples are presented only to illustrate this invention and are intended in no way to limit it. Obvious modifications will occur to persons skilled in the art. All parts are given by weight unless otherwise indicated.

EXAMPLE I

Tetrahydrofuran (250 parts) and p-terphenyl (1 part) (0.004 mole) were charged into a nitrogen-blanketed 3-necked flask equipped with a paddle-type stirrer, a Dry Ice reflux condenser, a gas inlet tube, a thermometer, and a sodium-addition funnel. The sodium-addition tube was charged with 0.25 gram atomic weight of sodium as a 25 percent dispersion in alkylate, 1 part (0.004 mole) of p-terphenyl, and 250 parts of tetrahydrofuran. The material in the addition funnel was agitated mechanically and 20–25 percent of it was added to the reactor at −35° C. Sulfur dioxide was then passed gradually into the reactor. When the blue color of sodium-terphenyl disappeared, an additional 10–15 parts of the sodium-terphenyl slurry was added. Similar increments, totalling 16, were added each time the color disappeared, until all of the sodium-terphenyl slurry had been transferred to the reactor. When the color faded after the addition of the final increment, the sulfur dioxide flow was terminated. Ethanol (100 parts) and water (50 parts) were added, and the mixture stirred for about one hour. The mixture was then allowed to settle, and all but about 50 parts of the mother liquor was removed by suction through a filter stick. The material remaining in the flask was treated with 2.5 parts of sodium chloride and heated, without stirring, for about ten minutes at 65° C. The remaining mother liquor was then removed through the filter, the solid was quickly washed with 25 parts of ethanol and then dried at 65° C. under reduced pressure, resulting in an 81 percent yield, based on the sulfur dioxide of 69 percent pure sodium hydrosulfite. The following table illustrates the advantages of 1–2$\mu$ sodium particles over larger particles or bulk sodium.

Table

| Sodium | | Mole Sulfur Dioxide | Tetrahydrofuran, ml. | Mole p-Terphenyl | Reaction Time, Minutes | Sodium Hydrosulfite | |
|---|---|---|---|---|---|---|---|
| Type | G. Atom | | | | | Percent Purity | Percent Yield (on Sodium) |
| Bulk | 0.25 | 0.25 | 500 | 0.25 | 33 | 26 | [1] 41 |
| Bulk | 0.25 | 0.25 | 500 | 0.0087 | 42 | 8 | [1] 3 |
| 5–10$\mu$ | 0.25 | 0.25 | 500 | 0.25 | 29 | 52 | 63 |
| 5–10$\mu$ | 0.25 | 0.25 | 500 | 0.0087 | 45 | 21 | 11 |
| 1–2$\mu$ | 0.25 | 0.17 | 500 | 0.0087 | 20 | 69 | 75 |

[1] All sodium and carrier added at start.

The data show that the yield of sodium hydrosulfite failed to exceed 50% with bulk sodium, even when stoichiometric quantities of p-terphenyl were used. With a coarse dispersion (5–10$\mu$) a yield of 63% was obtained using stoichiometric amounts of carrier, but only 11% resulted with a catalytic amount of p-terphenyl. The yield of sodium hydrosulfite from a very fine dispersion (1–2$\mu$) and a catalytic amount of p-terphenyl amounted to 75%.

EXAMPLE II

Example I was repeated, using 0.5 part (0.002 mole) p-terphenyl in the addition tube and 1 part (0.004 mole) p-terphenyl in the flask. The yield was 67 percent, based on sulfur dioxide, of 43 percent pure sodium hydrosulfite.

EXAMPLE III

Example I was repeated, using 0.5 part (0.002 mole) p-terphenyl in the reaction flask and 0.5 part (0.002 mole) p-terphenyl in the addition tube. The yield was 49 percent, based on sulfur dioxide, of 29 percent pure sodium hydrosulfite.

EXAMPLE IV

Example I was repeated, using the dimethyl ether of ethylene glycol as the solvent. The yield was 65 percent, based on sulfur dioxide; no estimate of purity could be made since the entire reaction product was taken up in water and an aliquot analyzed for sodium hydrosulfite.

EXAMPLE V

Example I was repeated, using dimethyl ether as the reaction medium. The yield of sodium hydrosulfite, based on sodium, was 75% of 80% purity.

While there are above disclosed but a limited number of embodiments of the invention herein presented, it is possible to produce still other embodiments without departing from the inventive concept herein disclosed, and it is desired therefore that only such limitations be imposed on the stated claims as are stated therein.

What is claimed is:

1. A process for preparing sodium hydrosulfite which comprises reacting sulfur dioxide and sodium at a temperature below about 0° C. in the presence of about 0.1 to about 5.0 mole percent of an organic carrier for said sodium, said sodium being present in the form of very finely dispersed particles whose average particle size is between about one and two microns, said dispersion of sodium being dispersed in an active ether and said carrier comprising an organic compound which forms an addition compound with the sodium without hydrogen evolution and being selected from the group consisting of polycyclic aromatic hydrocarbons, aromatic carbonyl compounds having no hydrogen atom attached to a carbon atom adjacent to the carbonyl group, diaryl ketones, esters of aromatic acids, dialkyl ketones having two tertiary alkyl groups adjacent to the carbonyl group, aryl alkyl ketones having a tertiary carbon atom adjacent to the carbonyl group, and alkyl derivatives of these compounds.

2. The process of claim 1 in which the carrier for the sodium is present in an amount of between 0.5 and 2.0 mole percent.

3. The process of claim 1 in which said carrier for the sodium is p-terphenyl.

4. The process of claim 1 in which said carrier for the sodium is naphthalene.

5. The process of claim 1 in which the sodium dispersion is suspended in tetrahydrofuran.

6. The process of claim 1 in which the sodium dispersion is suspended in dimethyl ether.

7. The process of claim 1 in which the sodium dispersion is suspended in the dimethyl ether of ethylene glycol.

8. The process of claim 1 in which the temperature is between about −5 and −35° C.

9. The process for isolating and stabilizing sodium hydrosulfite prepared as in claim 1 in which the sodium hydrosulfite is treated with water and an alcohol, concentrated, heated at a temperature in the range of about 55 to about 75° C., and washed with an alcohol.

10. The process of claim 9 in which the alcohol is ethanol.

11. The process of claim 9 in which the material was concentrated by filtration.

12. The process of claim 9 in which the material was heated at a temperature of about 65° C.

References Cited in the file of this patent

UNITED STATES PATENTS 2,083,870     Scott et al. _____ June 15, 1937